X555
A. H. Allen,
Bench Plane.
Patented Sep. 10. 1872.
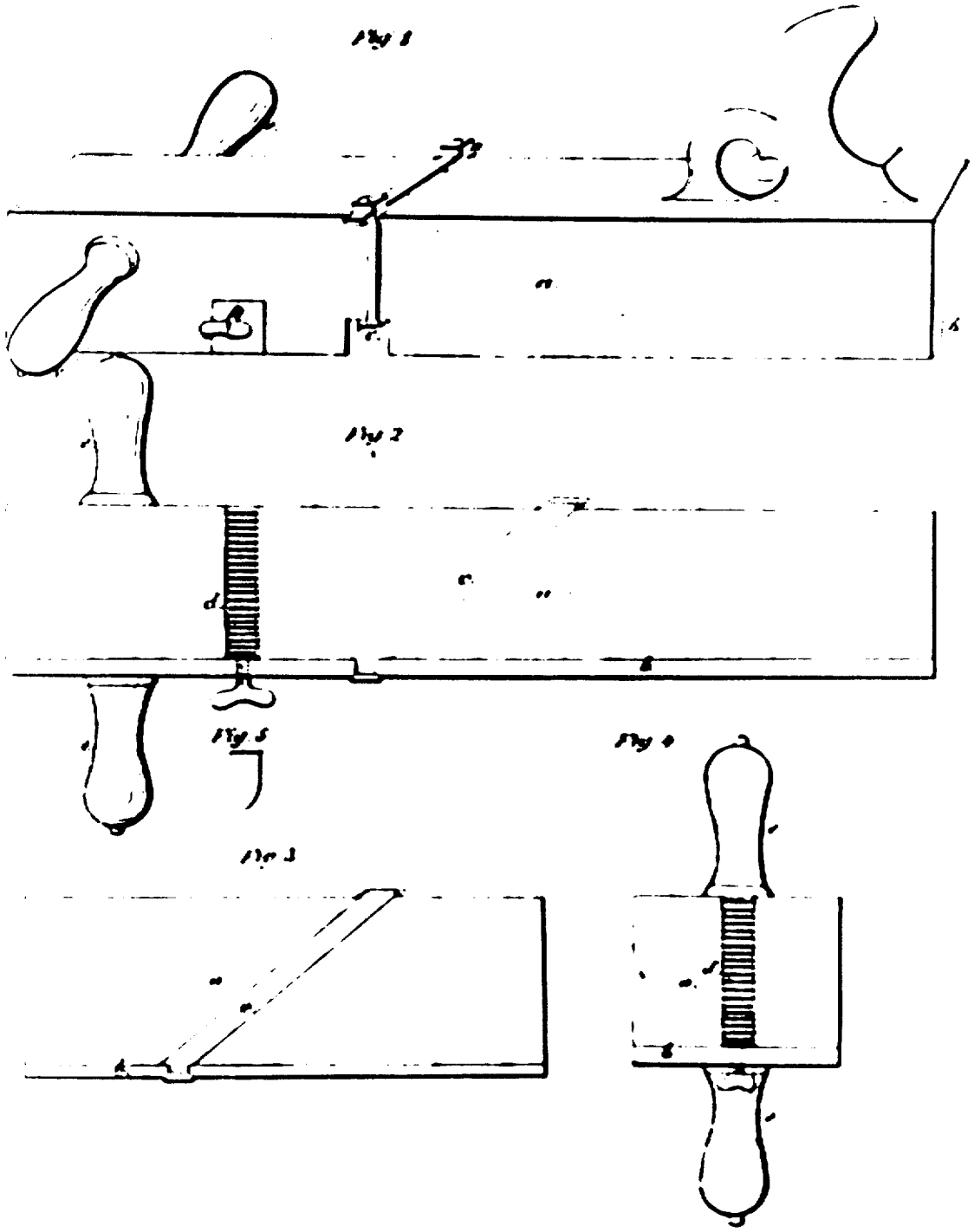

5805X

Amos D. Allen of Connecticut

May 10, 1804

Letters Patent May 11. 18[illegible]

The schedule referred to in these Letters Patent and making part of the same, containing a Description in the words of the said Amos D. Allen himself of his composition of matter for Tablets to write or draw on.

Take Linseed oil prepared by boiling a short time with quick lime and a small quantity of white Vitriol. Take four ounces of Gum copal made fine, half an ounce of Venice Turpentine, dissolve these in a Mattrass in a sand bath over a strong fire, then add two ounces of the above prepared [illegible] oil quite hot. Then grind with the above, [illegible] with a small [illegible] of white vitriol & sugar of lead, which will congeal the composition into a hard durable Body. It must be applied to the wood or other substance immediately or it will grow so stiff as to be impossible to spread it with a brush. When the Wood (&c) has received a sufficient coat of the above, & has become hard by being exposed to the Sun it is polished by pummice & rotten stone made fine and used in water with a piece of linnen. Delute the composition if necessary with spirits of Turpentine Witnesses Zephaniah Swift }
Lucretia Swift }

Amos D. Allen 220 words]

[illegible]

No Drawing [illegible]